US010027692B2

(12) United States Patent
Hay et al.

(10) Patent No.: US 10,027,692 B2
(45) Date of Patent: Jul. 17, 2018

(54) MODIFYING EVASIVE CODE USING CORRELATION ANALYSIS

(71) Applicant: International Business Machines Corporation, Armonk, NY (US)

(72) Inventors: Roee Hay, Haifa (IL); Sagi Kedmi, Raanana (IL); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 14/988,121

(22) Filed: Jan. 5, 2016

(65) Prior Publication Data
US 2017/0195347 A1    Jul. 6, 2017

(51) Int. Cl.
*H04L 29/06* (2006.01)
*G06F 21/50* (2013.01)

(52) U.S. Cl.
CPC .......... *H04L 63/1416* (2013.01); *G06F 21/50* (2013.01); *H04L 63/14* (2013.01); *H04L 63/1441* (2013.01)

(58) Field of Classification Search
None
See application file for complete search history.

(56) References Cited

U.S. PATENT DOCUMENTS

| | | | | |
|---|---|---|---|---|
| 7,840,958 B1 * | 11/2010 | Wan | ...................... | G06F 21/554 717/174 |
| 7,913,303 B1 * | 3/2011 | Rouland | ............. | H04L 63/1433 726/22 |
| 2006/0218145 A1 * | 9/2006 | Butcher | .................. | G06F 21/50 |
| 2007/0101431 A1 * | 5/2007 | Clift | ........................ | G06F 21/56 726/24 |
| 2007/0250930 A1 * | 10/2007 | Aziz | ..................... | G06F 21/554 726/24 |

(Continued)

OTHER PUBLICATIONS

Baig, Mirza et al., "The Study of Evasion of Packed PE from Static Detection", IEEE, 2012 World Congress on Internet Security (WorldCIS), Guelph, Ontario, Canada, Jun. 10-12, 2012, pp. 99-104.

(Continued)

*Primary Examiner* — Jason C Chiang
(74) *Attorney, Agent, or Firm* — Francis Lammes; Stephen J. Walder, Jr.; Jeffrey S. LaBaw

(57) ABSTRACT

An example computer-implemented method includes receiving, via a processor, an application to be tested, a set of intrusive monitoring capabilities, and a set of external monitoring capabilities. The method includes executing, via the processor, the application in a clean environment to generate unmonitored application behavior. The method includes executing, via the processor, the application with intrusive monitoring based on two randomly generated seeds to generate trigger events and external monitoring to detect changes of application behavior in response to the intrusive monitoring. The method includes computing, via the processor, a correlation measure between the trigger events and the detected changes in the application behavior. The method includes modifying, via the processor, the application in response to detecting the application is evasive based on the correlation measure.

15 Claims, 5 Drawing Sheets

(56) References Cited

U.S. PATENT DOCUMENTS

| | | | | |
|---|---|---|---|---|
| 2012/0110671 | A1* | 5/2012 | Beresnevichiene | G06F 8/10 726/25 |
| 2013/0167235 | A1* | 6/2013 | Kapoor | G06F 21/56 726/24 |
| 2014/0298461 | A1* | 10/2014 | Hohndel | H04L 63/1416 726/23 |
| 2014/0317745 | A1 | 10/2014 | Kolbitsch et al. | |
| 2015/0007325 | A1 | 1/2015 | Eliseev et al. | |
| 2015/0281267 | A1* | 10/2015 | Danahy | H04L 63/1416 726/23 |
| 2015/0295945 | A1* | 10/2015 | Canzanese, Jr. | G06F 9/45545 726/23 |
| 2016/0065620 | A1* | 3/2016 | Liu | H04L 63/1408 726/1 |
| 2016/0078347 | A1* | 3/2016 | Salajegheh | G06N 5/04 706/12 |
| 2017/0149804 | A1* | 5/2017 | Kolbitsch | H04L 63/1416 |
| 2017/0177868 | A1* | 6/2017 | Hay | G06F 21/565 |

OTHER PUBLICATIONS

Kirat, Dhilung et al., "BareCloud: Bare-metal Analysis-based Evasive Malware Detection", USENIX, Proceedings of the 23rd USENIX Security Symposium, San Diego, CA, Aug. 20-22, 2014, pp. 287-301.

Moser, Andreas et al., "Limits of Static Analysis for Malware Detection", IEEE, Twenty-Third Annual Computer Security Applications Conference (ACSAC 2007), Miami Beach, FL, Dec. 10-14, 2007, 10 pages.

Smith, Chris, "Up to 5 million Android users have malware issues", Yahoo News, http://news.yahoo.com/5-million-android-users-malware-issues-105055328.html, Jun. 26, 2014, 9 pages.

\* cited by examiner

MODIFYING EVASIVE CODE USING CORRELATION ANALYSIS

BACKGROUND

The present techniques relate to modifying evasive code in applications. More specifically, the techniques relate to modifying evasive code using correlation analysis.

SUMMARY

According to an embodiment described herein, a system can include a processor to receive a set of intrusive monitoring capabilities, and a set of external monitoring capabilities. The processor can also further execute an application in a clean environment to generate unmonitored application behavior. The processor can also execute the application with intrusive monitoring based on two randomly generated seeds to generate trigger events. The processor can further execute external monitoring to detect changes in application behavior in response to executing the intrusive monitoring. The processor can also further detect whether a threshold number of monitoring iterations is exceeded. The processor can also compute a correlation measure between the trigger events and the detected changes in the application behavior. The processor can also detect whether the application is evasive based on the correlation measure. The processor can further modify the detected evasive application.

According to another embodiment described herein, a method can include receiving, via a processor, an application to be tested, a set of intrusive monitoring capabilities, and a set of external monitoring capabilities. The method can further include executing, via the processor, the application in a clean environment to generate unmonitored application behavior. The method can also further include executing, via the processor, the application with intrusive monitoring based on two randomly generated seeds to generate trigger events and external monitoring to detect changes of application behavior in response to the intrusive monitoring. The method can also include computing, via the processor, a correlation measure between the trigger events and the detected changes in the application behavior. The method can also further include modifying, via the processor, the application in response to detecting the application is evasive based on the correlation measure.

According to another embodiment described herein, a computer program product for modifying evasive applications can include a computer-readable storage medium having program code embodied therewith. The computer readable storage medium is not a transitory signal per se. The program code, executable by a processor, causes the processor to receive an application to be tested, a set of intrusive monitoring capabilities, and a set of external monitoring capabilities. The program code can also cause the processor to execute the application in a clean environment to generate unmonitored application behavior. The program code can also cause the processor to execute the application with intrusive monitoring based on two randomly generated seeds to generate trigger events. A trigger time of the intrusive monitoring is based on a first random seed and a monitoring type of the intrusive monitoring is based on a second random seed. The program code can also cause the processor to execute external monitoring to detect changes in application behavior in response to the intrusive monitoring. The program code can also cause the processor to detect whether a threshold number of iterations of monitoring is exceeded. The program code can also cause the processor to also further compute a correlation measure between the trigger events and the detected changes in application behavior. The program code can also cause the processor to detect whether the application is evasive based on the correlation measure. The program code can also further cause the processor to modify the detected evasive application.

DETAILED DESCRIPTION

Figure 1:
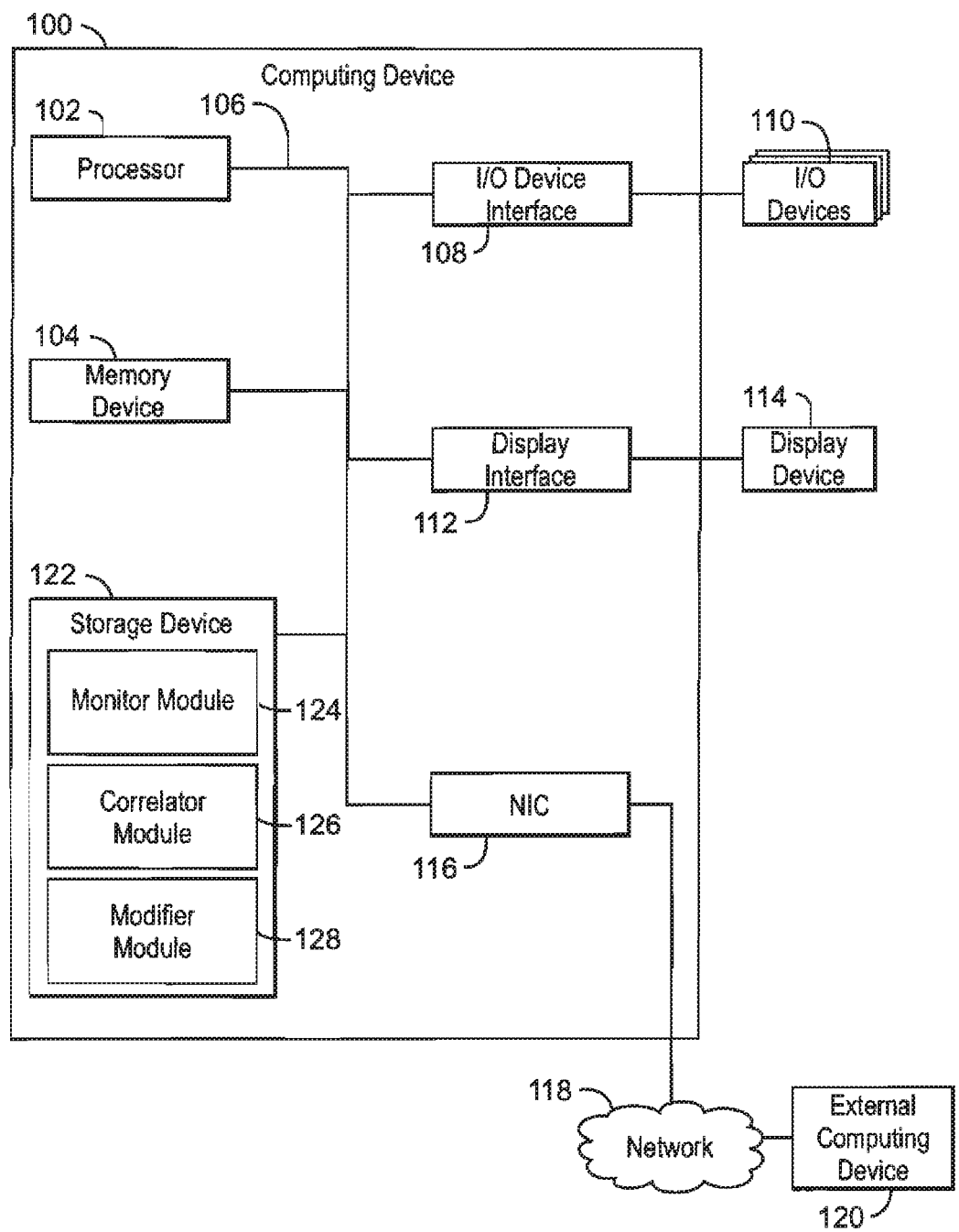
FIG. 1 is a block diagram of an exemplary computing device that can modify evasive code using correlation analysis in accordance with an illustrative embodiment.

Malicious software is prevalent. Recent statistics indicate that up to 5 million mobile devices are affected by malware issues. Such malware issues include, for example, stealing sensitive information or exploiting the user financially. For example, the malware may send unauthorized SMS messages for which the user is charged a premium price. In order to be persistent and resilient to detection and removal, malware software typically disguises itself as benign. For example, an SMS message malware may be disguised as a flashlight program that enables control of a light on a mobile device.

In addition, the true functionality of benign software may also be disguised for intellectual property (IP) protection. Some applications are designed to resist reverse engineering, debugging or monitoring as a defense against users who are interested in studying application implementation, data and/or design. Such analysis could compromise the IP embodied in an application and reveal to attackers potential attack vectors.

In both of the scenarios above, the application thus attempts to mask true functionality when the application detects that it is being monitored. This type of behavior is known as evasion. Detection of evasive software is therefore challenging. Evasive applications are designed to change behavior upon being observed, such that true application functionality remains hidden. This is particularly problematic in the case of evasive malware.

According to embodiments of the present disclosure, a computing system can modify detected evasive applications. For example, the system can receive an application to be tested, a set of intrusive monitoring capabilities and a set of external monitoring capabilities. The system can generate two random seeds to be used to trigger intrusive monitoring. The system can then execute the application and execute the intrusive monitoring based on the two random seeds. For example, one seed can be used to determine when the intrusive monitoring is applied and the other seed can be used to determine which intrusive monitoring is applied. The system can then apply external monitoring to detect changes caused by the intrusive monitoring. In some examples, the system can perform monitoring until a threshold number of monitoring iterations is exceeded. For example, the threshold number of iterations may be a statistically number of iterations. The system can detect that the application is evasive based on a computed correlation between trigger events and changes detected by the external monitoring. The system can then modify the detected evasive application. Thus, embodiments of the present disclosure enable evasive applications to be both detected and modified. For example, benign functions may be allowed to persist while potentially malicious behavior that occurs in an unmonitored state can be prevented.

In some scenarios, the techniques described herein may be implemented in a cloud-computing environment. As discussed in more detail below in reference to at least FIGS. 1, 3, and 4, a computing device configured to modify evasive application based on correlation analysis may be implemented in a cloud-computing environment. It is understood in advance that although this disclosure may include a description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure comprising a network of interconnected nodes.

With reference now to FIG. 1, a block diagram is provided of an exemplary computing device that can modify evasive code using correlation analysis in accordance with an illustrative embodiment. The computing device 100 may be for example, a server, desktop computer, laptop computer, tablet computer, or smartphone. In some examples, computing device 100 may be a cloud-computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud-computing environments where tasks are performed by remote processing devices that are linked through a communications network. In a distributed cloud-computing environment, program modules may be located in both local and remote computer system storage media including memory storage devices.

The computing device 100 may include a processor 102 that is to execute stored instructions and a memory device 104 to provide temporary memory space for operations of said instructions during operation. The processor 102 can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external webserver. In some examples, external computing device 120 may be a cloud-computing node.

The processor 102 may also be linked through the system interconnect 106 to a storage device 122 that can include a hard drive, an optical drive, a USB flash drive, an array of drives, or any combinations thereof. In some examples, the storage device may include a monitor module 124, a correlator module 126, and a modifier module 128. The monitor module 124 can receive an application to be tested. The monitor module 124 can also receive a set of intrusive monitoring capabilities and a set of external monitoring capabilities. For example, the intrusive monitoring capabilities can include a debug breakpoint, a compile-time instrumentation, and a run-time instrumentation, among other possible intrusive monitoring capabilities. The external monitoring capabilities can include a file-system listener, a hypertext transfer protocol (HTTP) sniffer, an inter-process communication (IPC) interceptor, among other external monitoring capabilities. The monitor module 124 can execute the application in a clean environment to generate unmonitored application behavior. For example, the clean environment can be any suitable hardware environment based on the environment in which the application would normally run. For example, the clean environment may include an unmodified operating environment, etc. The monitor module 124 may then execute the application with intrusive monitoring based on the two randomly generated seeds to generate trigger events. For example, a trigger time of the intrusive monitoring can be based on a first random seed and a monitoring type of the intrusive monitoring can be based on a second random seed. A trigger time, as used herein, refers to a time that the intrusive monitoring hint is sent. The trigger time can be calculated based on a randomly generated time using the first random seed. A monitoring type, as used herein, refers to a particular form of intrusive monitoring that is chosen. In some examples, the monitoring type can be chosen randomly from a list of monitoring types using the second randomly generated seed. The monitor module 124 can execute external monitoring to detect changes in application behavior in response to executing the intrusive monitoring. For example, the detected changes in the external monitoring may be based on a comparison between unmonitored application behavior and application behavior with intrusive monitoring. The detected changes may be detected differences between unmonitored behavior and application behavior after intrusive monitoring is executed. The correlator module 126 can detect whether a threshold number of monitoring iterations is exceeded. For example, the threshold number of monitoring iterations can be a statistically number of iterations. In some examples, the correlator module 126 can cause the monitor module 124 to perform additional monitoring if a statistically number of iterations is not detected. The correlator module 126 can compute a correlation measure between the trigger events and the detected changes in the application behavior. The modifier module 128 can detect whether the application is evasive based on the correlation measure. For example, if the correlation measure exceeds a threshold correlation value, then the modifier module 128 can detect the application is evasive. The modifier module 128 can then modify the detected evasive application. For example, the modifier module 128 can remove blocks associated with a detected difference between unmonitored behavior and application behavior after intrusive monitoring is executed. For example, the removed blocks can be related to a behavior of the application that differs from monitored behavior of the application.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the monitor module 124, the correlator module 126, and the modifier module 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the monitor module 124, correlator module 126, and modifier module 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
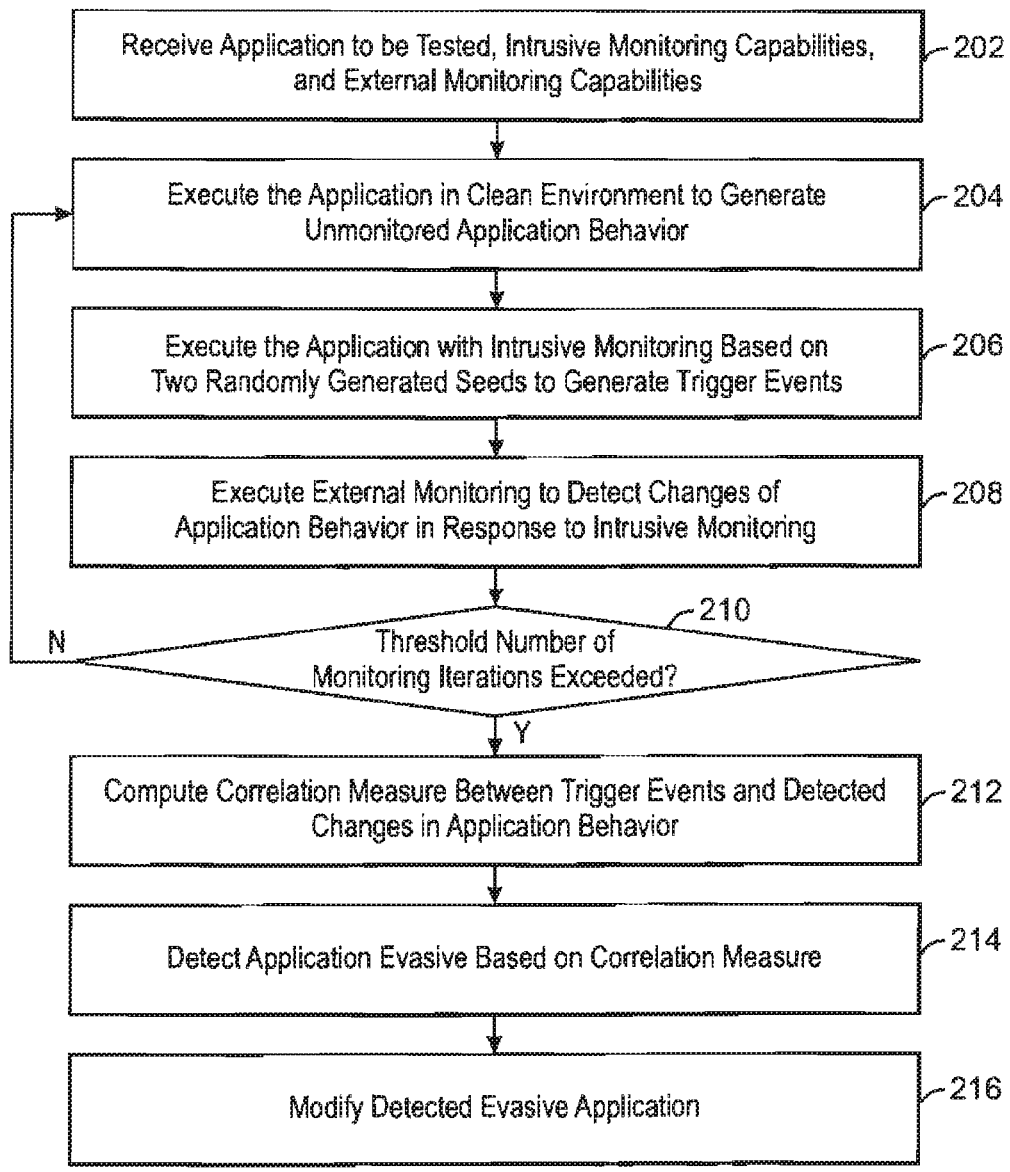
FIG. 2 is a process flow diagram of an example method for modifying evasive code based on correlation analysis in accordance with an illustrative embodiment.

FIG. 2 is a process flow diagram of an example method for modifying evasive code based on correlation analysis in accordance with an illustrative embodiment. The method 200 can be implemented with any suitable computing device, such as the computing device 100 of FIG. 1.

At block 202, the computing device receives an application to be tested, a set of intrusive monitoring capabilities, and a set of external monitoring capabilities. For example, the intrusive monitoring capabilities can include a debug breakpoint, a compile-time instrumentation, and a run-time instrumentation, among other possible intrusive monitoring capabilities. The external monitoring capabilities can include a file-system listener, a hypertext transfer protocol (HTTP) sniffer, an inter-process communication (IPC) interceptor, among other external monitoring capabilities.

At block 204, the computing device executes the application in a clean environment to generate unmonitored application behavior. For example, the clean environment can be a native environment that the application would normally run on without any form of intrusive monitoring. For example, the clean environment can be a cell phone, mobile device, or any other appropriate environment. Thus, the application behaves as if it was installed on the particular device.

At block 206, the computing device executes the application with intrusive monitoring based on two randomly generated seeds to generate trigger events. For example, a trigger time of the intrusive monitoring can be based on a first random seed and a monitoring type of the intrusive monitoring can be based on a second random seed. In some examples, the seeds can be randomly generated Boolean numbers. In some examples, based on the trigger time, the computing device can intercept a request from the application and return values and/or wait before responding according to the type of intrusive monitoring. For example, a particular intrusive monitor may introduce a predetermined amount of delay in response or a particular value in response to the request. The application may then behave as if it was being monitored intrusively. For example, if the application has any evasive functionality, it may respond to the change in environment resulting from being monitored intrusively.

At block 208, the computing device executes external monitoring to detect changes of the application behavior in response to the intrusive monitoring. For example, detecting a change can include comparing the unmonitored behavior of the application with the behavior of the application with intrusive monitoring.

At block 210, the computing device determines whether a threshold number of iterations of monitoring is exceeded. For example, the threshold number of monitoring iterations can be a statistically number of iterations of monitoring based on a p-value being less than a predetermined significance level. If at block 210 a statistically number of iterations of monitoring have been performed, then the method can continue at block 212. If at block 210 a statistically number of iterations of monitoring is not detected, then the computing device may perform additional monitoring and the method may thus proceed to block 204. In some examples, the computing device may perform additional monitoring until the threshold number of iterations of monitoring is exceeded.

At block 212, the computing device computes a correlation measure between the trigger events and the detected changes in application behavior. For example, the correlation measure can include a correlation coefficient such as a Pearson product-moment correlation coefficient. In some examples, detecting a change can include detecting a difference between unmonitored behavior and application behavior after intrusive monitoring is executed.

At block 214, the computing device detects that, the application is evasive based on the correlation measure. For example, the computing device can detect that the correlation measure exceeds a threshold correlation coefficient value.

At block 216, the computing device modifies the detected evasive application. For example, the computing device can modify the application in response to detecting that the application is evasive. In some examples, the computing device can modify the detected evasive application by removing blocks associated with a detected difference between unmonitored behavior and application behavior after intrusive monitoring is executed. For example, the removed blocks may be related to behavior that differs from monitored behavior. In some examples, the computing device can display a list of blocks associated with behavior that differs from monitored behavior of the application and receive a list of blocks to remove.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
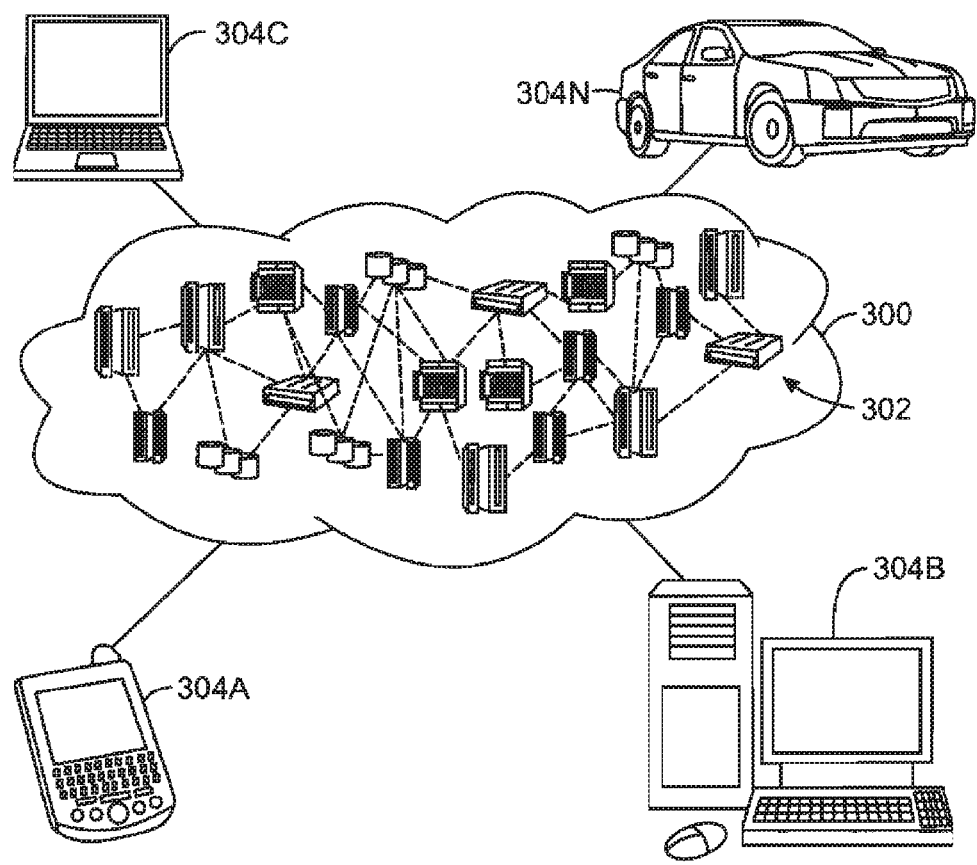
FIG. 3 is a block diagram of an example cloud-computing environment according to embodiments described herein.

Referring now to FIG. 3, illustrative cloud-computing environment 300 is depicted. As shown, cloud-computing environment 300 comprises one or more cloud-computing nodes 302 with which local computing devices used by cloud consumers, such as, for example, personal digital assistant (PDA) or cellular telephone 304A, desktop computer 304B, laptop computer 304C, and/or automobile computer system 304N may communicate. Cloud-computing nodes 302 may communicate with one another. They may be grouped (not shown) physically or virtually, in one or more networks, such as Private, Community, Public, or Hybrid clouds as described hereinabove, or a combination thereof. This allows cloud-computing environment 300 to offer infrastructure, platforms and/or software as services for which a cloud consumer does not need to maintain resources on a local computing device. It is understood that the types of computing devices 304A-N shown in FIG. 3 are intended to be illustrative only and that cloud-computing nodes 302 and cloud-computing environment 300 can communicate with any type of computerized device over any type of network and/or network addressable connection (e.g., using a web browser).

Figure 4:
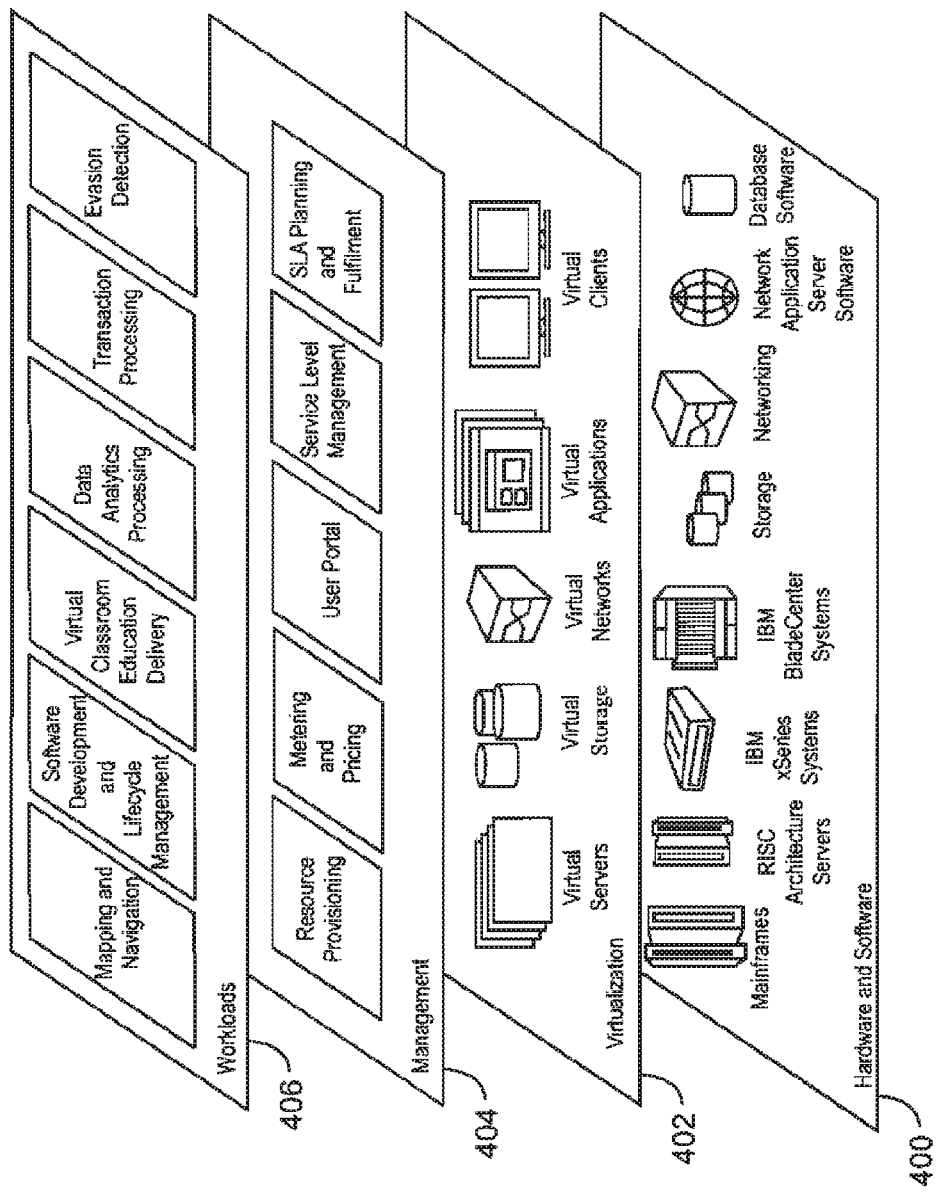
FIG. 4 is an example of abstraction model layers according to embodiments described herein.

Referring now to FIG. 4, a set of functional abstraction layers provided by cloud-computing environment 300 (FIG. 3) is shown. It should be understood in advance that the components, layers, and functions shown in FIG. 4 are intended to be illustrative only and embodiments of the invention are not limited thereto. As depicted, the following layers and corresponding functions are provided.

Hardware and software layer 400 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 402 provides an abstraction layer from which the following examples of virtual entities may be provided: virtual servers; virtual storage; virtual networks, including virtual private networks; virtual applications and operating systems; and virtual clients. In one example, management layer 404 may provide the functions described below. Resource provisioning provides dynamic procurement of computing resources and other resources that are utilized to perform tasks within the cloud-computing environment. Metering and Pricing provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal provides access to the cloud-computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 406 provides examples of functionality for which the cloud-computing environment may be utilized. Examples of workloads and functions, which may be provided from this layer, include: mapping and navigation; software development and lifecycle management; virtual classroom education delivery; data analytics processing; transaction processing; and evasion detection.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present, techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present, techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
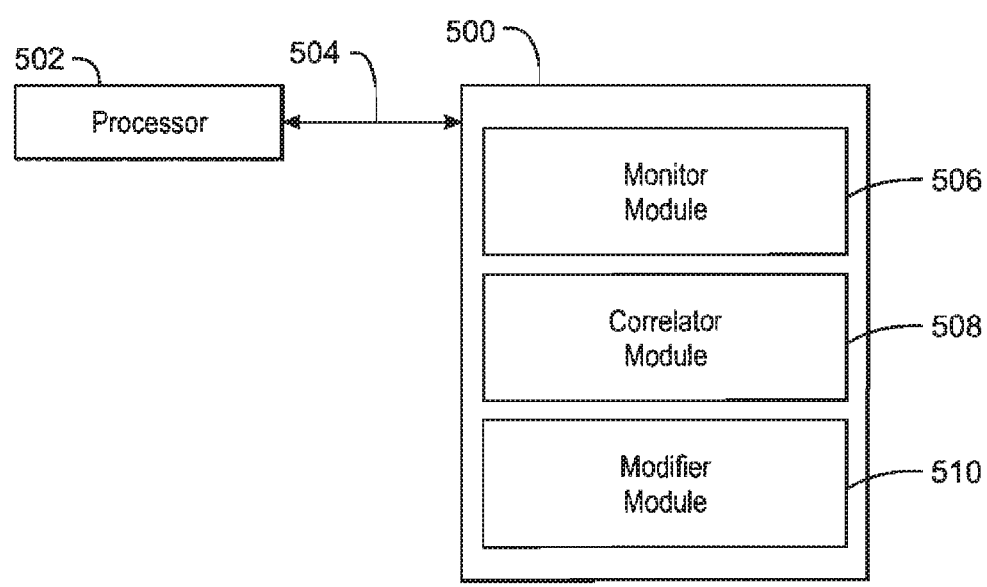
FIG. 5 is an example tangible, non-transitory computer-readable medium that can modify evasive applications based on correlation analysis.

Referring now to FIG. 5, a block diagram is depicted of an example tangible, non-transitory computer-readable medium 500 that can modify evasive applications based on correlation analysis. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the method 200 of FIG. 2 above.

The various software components discussed herein may be stored on the tangible, non-transitory, computer-readable medium 500, as indicated in FIG. 5. For example, a monitor module 506 includes code to receive an application to be tested. The monitor module 506 also includes code to receive a set of intrusive monitoring capabilities, and a set of external monitoring capabilities. The monitor module 506 includes code to execute the application in a clean environment to generate unmonitored application behavior. The monitor module 506 also includes code to execute the application with intrusive monitoring based on two randomly generated seeds to generate trigger events. For example, a trigger time of the intrusive monitoring is based on a first random seed and a monitoring type of the intrusive monitoring is based on a second random seed. In some examples, the monitor module 506 can monitor intrusively using a debug breakpoint, a compile-time instrumentation, a run-time instrumentation, or any combination thereof. The monitor module 506 further includes code to execute external monitoring to detect changes in application behavior in response to the intrusive monitoring. A correlator module 508 includes code to compute a correlation measure between trigger events and detected changes in the application behavior. In some examples, the correlator module 508 can include code to detect whether a threshold number of iterations of monitoring is exceeded. For example, the threshold number of iterations can be a statistically number of iterations. In some examples, the correlator module 508 can include code to cause the monitor module 506 to perform additional monitoring iterations if the threshold number of iterations is not exceeded. A modifier module 510 includes code to detect whether the application is evasive based on the correlation measure. For example, the modifier module 510 can detect the application is evasive if the correlation measure exceeds a threshold correlation coefficient value. The modifier module 510 also includes code to modify the detected evasive application. For example, the modifier module 510 can include code to remove blocks of the detected evasive application associated with a detected difference between unmonitored behavior and application behavior after intrusive monitoring is executed. For example, the removed blocks can specifically be related to a behavior that differs from monitored behavior of the application. In some examples, the modifier module 510 can include code to display a list of blocks associated with behavior that differs from monitored behavior of the application and receive a list of blocks to remove. It is to be understood that any number of additional software components not shown in FIG. 5 may be included within the tangible, non-transitory, computer-readable medium 500, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 5 may be included within the tangible, non-transitory, computer-readable medium 500, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor; and
a memory coupled to the processor, wherein the memory comprises instructions which, when executed by the processor, cause the processor to:
receive an application to be tested, a set of intrusive monitoring capabilities, and a set of external monitoring capabilities;
execute the application in a clean environment to generate unmonitored application behavior of the application;
execute the application with intrusive monitoring using one or more of the set of intrusive monitoring capabilities based on two randomly generated seeds to generate trigger events, wherein a trigger time of the intrusive monitoring is based on a first random seed and a monitoring type of the intrusive monitoring is based on a second random seed;
execute external monitoring using one or more of the set of external monitoring capabilities to detect changes in application behavior of the application in response to executing the intrusive monitoring, wherein the detected changes in the application behavior of the application comprise a detected difference between the unmonitored behavior of the application and the application behavior of the application after the intrusive monitoring is executed;
compute a correlation measure between the trigger events and the detected changes in the application behavior of the application; and
responsive to the correlation measure exceeding a threshold correlation value, modify the application by removing one or more blocks of code of the application associated with the detected difference between the unmonitored behavior of the application and application behavior of the application after intrusive monitoring is executed.

2. The system of claim 1, wherein the instructions further cause the processor to:
prior to computing the correlation measure between the trigger events and the detected changes in the application behavior of the application, detect whether a threshold number of monitoring iterations is exceeded; and
perform additional monitoring until the threshold number of iterations is exceeded.

3. The system of claim 1, wherein the intrusive monitoring capabilities comprise a debug breakpoint, a compile-time instrumentation, a run-time instrumentation, or any combination thereof.

4. The system of claim 1, wherein the external monitoring capabilities comprise a file-system listener, a hypertext transfer protocol (HTTP) sniffer, an inter-process communication (IPC) interceptor, or any combination thereof.

5. The system of claim 1, wherein the instructions further cause the processor to:
display a list of blocks of the code of the application associated with the detected difference between the unmonitored behavior of the application and application behavior of the application after intrusive monitoring is executed to a user; and
receive, from the user, the one or more blocks of the code of the application within the list of blocks to remove.

6. A computer-implemented method, comprising:
receiving, via a processor, an application to be tested, a set of intrusive monitoring capabilities, and a set of external monitoring capabilities;
executing, via the processor, the application in a clean environment to generate unmonitored application behavior of the application;
executing, via the processor, the application with intrusive monitoring using one or more of the set of intrusive monitoring capabilities based on two randomly generated seeds to generate trigger events, wherein a trigger time of the intrusive monitoring is based on a first random seed and a monitoring type of the intrusive monitoring is based on a second random seed;
executing, via the processor, external monitoring using one or more of the set of external monitoring capabilities to detect changes in application behavior of the application in response to executing the intrusive monitoring, wherein the detected changes in the application behavior of the application comprise a detected difference between the unmonitored behavior of the application and the application behavior of the application after the intrusive monitoring is executed;
computing, via the processor, a correlation measure between the trigger events and the detected changes in the application behavior of the application; and
responsive to the correlation measure exceeding a threshold correlation value, modifying, via the processor, the application by removing one or more blocks of code of the application associated with the detected difference between the unmonitored behavior of the application and application behavior of the application after intrusive monitoring is executed.

7. The computer-implemented method of claim 6, further comprising:
prior to computing the correlation measure between the trigger events and the detected changes in the application behavior of the application, detecting, via the processor, whether a threshold number of iterations of monitoring is exceeded; and
performing additional monitoring until the threshold number of iterations is exceeded.

8. The computer-implemented method of claim 6, wherein the intrusive monitoring capabilities comprise a debug breakpoint, a compile-time instrumentation, a run-time instrumentation, or any combination thereof.

9. The computer-implemented method of claim 6, wherein the external monitoring capabilities comprise a file-system listener, a hypertext transfer protocol (HTTP) sniffer, an inter-process communication (IPC) interceptor, or any combination thereof.

10. The computer-implemented method of claim 6, further comprising:
displaying a list of blocks of the code of the application associated with the detected difference between the unmonitored behavior of the application and application behavior of the application after intrusive monitoring is executed to a user; and
receiving, from the user, the one or more blocks within the list of blocks of the code of the application to remove.

11. A computer program product for modifying evasive applications, the computer program product comprising a computer-readable storage medium having program code embodied therewith, wherein the computer readable storage medium is not a transitory signal per se, the program code executable by a processor to cause the processor to:
receive an application to be tested, a set of intrusive monitoring capabilities, and a set of external monitoring capabilities;
execute the application in a clean environment to generate unmonitored application behavior of the application;
execute the application with intrusive monitoring using one or more of the set of intrusive monitoring capabilities based on two randomly generated seeds to generate trigger events, wherein a trigger time of the intrusive monitoring is based on a first random seed and a monitoring type of the intrusive monitoring is based on a second random seed;
execute external monitoring using one or more of the set of external monitoring capabilities to detect changes in application behavior of the application in response to executing the intrusive monitoring, wherein the detected changes in the application behavior of the application comprise a detected difference between the unmonitored behavior of the application and the application behavior of the application after the intrusive monitoring is executed;
compute a correlation measure between the trigger events and the detected changes in application behavior of the application;
and
responsive to the correlation measure exceeding a threshold correlation value, modify the application by removing one or more blocks of code of the application associated with the detected difference between the unmonitored behavior of the application and application behavior of the application after intrusive monitoring is executed.

12. The computer program product of claim 11, wherein the program code further causes the processor to:
prior to computing the correlation measure between the trigger events and the detected changes in the application behavior of the application, detect whether a threshold number of monitoring iterations is exceeded; and perform additional monitoring iterations until the threshold number of iterations is exceeded.

13. The computer program product of claim 11, wherein the program code further causes the processor to:
monitor intrusively using a debug breakpoint, a compile-time instrumentation, a run-time instrumentation, or any combination thereof.

14. The computer program product of claim 11, wherein the program code further causes the processor to:
display a list of blocks of the code of the application associated with the detected difference between the unmonitored behavior of the application and application behavior of the application after intrusive monitoring is executed to a user; and
receive, from the user, the one or more blocks of the code of the application within the list of blocks to remove.

15. The computer program product of claim 11, wherein the program code further causes the processor to:
execute the external monitoring using a file-system listener, a hypertext transfer protocol (HTTP) sniffer, an inter-process communication (IPC) interceptor, or any combination thereof.

* * * * *